United States Patent [19]

Nakayama et al.

[11] Patent Number: 4,579,199
[45] Date of Patent: Apr. 1, 1986

[54] REMOTE OPERATION TYPE DAMPING FORCE CONTROL MECHANISM FOR HYDRAULIC DAMPER

[75] Inventors: Sumio Nakayama; Shizumasa Tsukamoto; Masahiro Hirano, all of Shizuoka, Japan

[73] Assignee: Kabushiki Kaisha Showa Seisakusho, Tokyo, Japan

[21] Appl. No.: 766,073

[22] Filed: Aug. 14, 1985

Related U.S. Application Data

[63] Continuation of Ser. No. 535,370, Sep. 23, 1983, abandoned.

[30] Foreign Application Priority Data

Sep. 24, 1982 [JP] Japan .................. 57-167006
Nov. 25, 1982 [JP] Japan .................. 57-178174[U]
Nov. 25, 1982 [JP] Japan .................. 57-178175[U]

[51] Int. Cl.$^4$ ............................. F16F 9/46
[52] U.S. Cl. ..................... 188/299; 74/84 R; 74/416; 74/436; 188/319; 464/52
[58] Field of Search ............. 188/285, 299, 319; 74/436, 421, 416, 820, 84 R; 464/52, 58-68

[56] References Cited

U.S. PATENT DOCUMENTS

| 1,224,079 | 4/1917 | Davidson | 74/436 |
| 1,774,789 | 9/1930 | Dina | 74/436 |
| 2,158,266 | 5/1939 | Aldrich | 74/416 X |
| 2,559,509 | 7/1951 | Mercier et al. | 74/436 |
| 3,225,615 | 12/1965 | Little | 74/416 |
| 3,286,536 | 11/1966 | Hallmann | 74/84 |
| 4,183,509 | 1/1980 | Nishikawa | 188/319 X |
| 4,337,850 | 7/1982 | Shimokura | 188/319 |

FOREIGN PATENT DOCUMENTS

| 226849 | 12/1958 | Australia | 188/299 |
| 444154 | 5/1927 | Fed. Rep. of Germany | 74/416 |

Primary Examiner—George E. A. Halvosa
Attorney, Agent, or Firm—Irving M. Weiner; Joseph P. Carrier; John J. Cantarella

[57] ABSTRACT

A remote operation type damping force control mechanism for a hydraulic damper including a cylinder, a piston, and a hollow piston rod having therein an oil path interconnecting a pair of chambers separated from each other by the piston in the cylinder. The mechanism comprises an adjustment rod rotatably inserted in the hollow piston rod and provided at the inner end thereof with an orifice plate having a plurality of orifices of different diameters, a remote operation part provided with an operation member, a control cable operatively integrally connected with the operation member and lead out of the remote operation part, and a driving mechanism interposed between the control cable and the adjustment rod for driving to rotate the adjust rod in accordance with the rotation of the operation member of the remote operation part. The driving mechanism has a plurality of first pins projectingly provided on an end face of the adjustment rod and a single second pin integrally jointed with the distal end of the control cable and perpendicularly engageable with the first pins.

7 Claims, 12 Drawing Figures

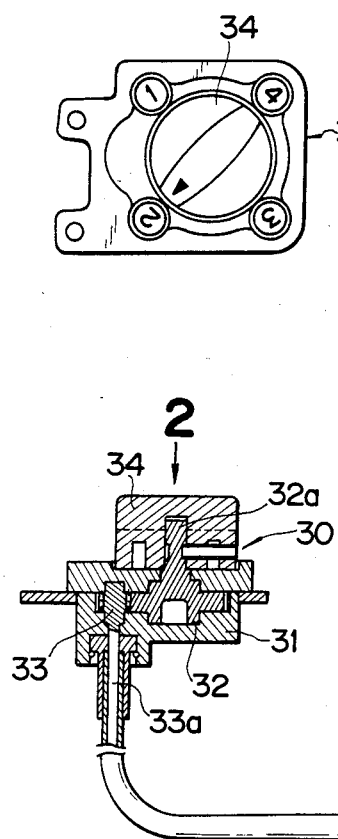
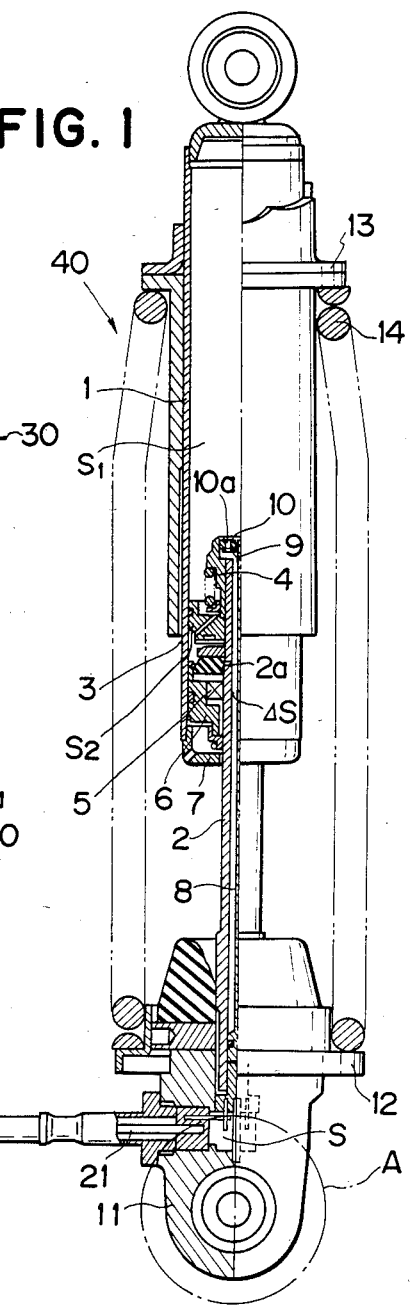

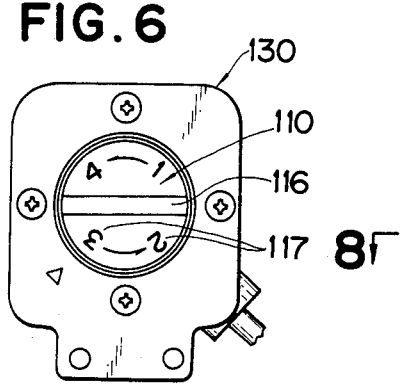
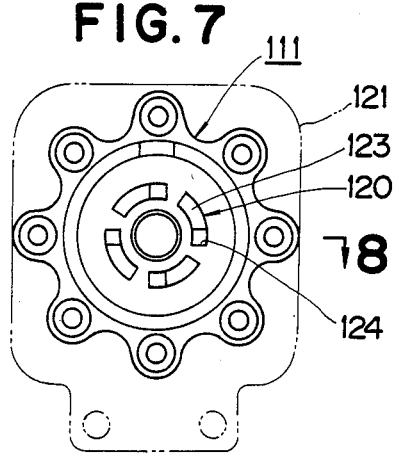
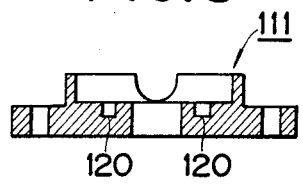
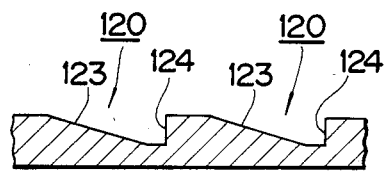
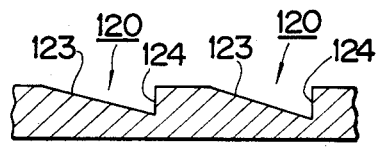
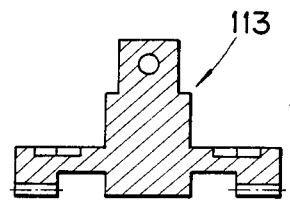
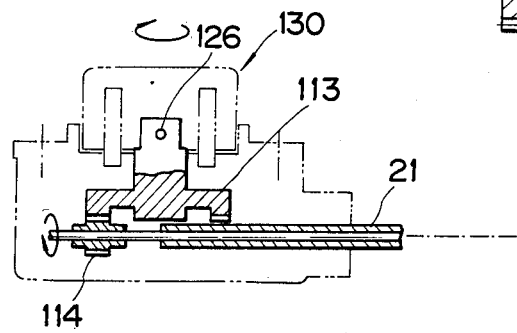

REMOTE OPERATION TYPE DAMPING FORCE CONTROL MECHANISM FOR HYDRAULIC DAMPER

This is a continuation of application Ser. No. 535,370, filed Sept. 23, 1983, now abandoned.

BACKGROUND OF THE INVENTION

1. Field of the Invention

The present invention relates to an improvement in a remote operation type damping force control mechanism for hydraulic dampers, which permits a remote operational control of the damping force of a hydraulic damper.

2. Description of Relevant Art

The damping force of a hydraulic damper is generated by hydrodynamic resistances which the hydraulic oil sealed in a cylinder of the hydraulic damper receives when passing through oil paths. Thus, the damping force is selectively controllable with a variable oil path area which causes a variation of hydrodynamic resistance.

There have been proposed various mechanisms for controlling the damping force.

For example, there is one known mechanism, in which an adjustment rod is rotatably inserted in a hollow piston rod, the adjustment rod is provided at an end part thereof with an orifice plate having a plurality of varying diameter orifices, and by rotating the adjustment rod the orifice diameter is properly selected, to thereby control the hydrodynamic resistance and thus the damping force.

The present invention particularly relates to an improvement in a remote operation type damping force control mechanism for a hydraulic damper including a damping force control mechanism of such type as described above, in which the control may be effected by a remote operation for the convenience of adjustment work, such as when the mechanism is applied to vehicles, for example.

Among conventional remote operation mechanisms for damping force control devices, there is one type in which a gear is provided at an end part of an adjustment rod, a control cable rotatable about its own axis is lead out from a remote operation part including an adjustment dial, a pinion is provided at the distal end of the control cable, and an adjustment rod is rotated through the meshing engagement between the pinion and the gear.

However, in such conventional mechanism, there is provided no allowance or play in the engagement between a pinion and a gear, with the exception of a slight backlash. Therefore, while an adjustment rod is rotated by rotating an adjustment dial in a remote operation part, a control cable has a torsion developed therein, so that the degree of rotation of the adjustment dial is not sufficiently transmitted to the adjustment rod. Moreover, when released from the operation force, the adjustment dial is to rotate in reverse to the same degree as the torsion of the control cable, thus resulting in a disadvantage in that a correct adjustment of damping force cannot be easily attained.

The present invention has been achieved to effectively eliminate such disadvantages.

SUMMARY OF THE INVENTION

According to the present invention, there is provided a remote operation type damping force control mechanism for a hydraulic damper including a cylinder filled with hydraulic oil, a piston slidably fitted in the cylinder, the piston separating the interior of the cylinder into a first chamber and a second chamber, and a hollow piston rod having therein an oil path permitting the first and second chambers of the cylinder to communicate with each other through holes opening into the first and second chambers, respectively. The control mechanism comprises an adjustment rod rotatably inserted in the hollow piston rod and provided at the inner end thereof with an orifice plate having a plurality of orifices of different diameters to render the adjustment rod capable of varying the area of the oil path with its own rotation. A remote operation part is provided for controlling the rotation of the adjustment rod, the remote operation part having an operation member, a control cable operatively integrally connected with the operation member so as to be twisted upon operation of said operation member, the control cable extending from the remote operation part to the vicinity of the outer end of the adjustment rod, and a driving mechanism interposed between the distal end of the control cable and the outer end of the adjustment rod for driving to rotate the adjustment rod in accordance with the operation of the operation member of the remote operation part. The drving mechanism has a plurality of first pins projectingly provided on the end face of the outer end of the adjustment rod and a second pin integrally jointed with the distal end of the control cable and perpendicularly engageable with the first pins.

Accordingly, an object of the present invention is to provide a remote operation type damping force control mechanism for hydraulic dampers, in which the torsion stored in a control cable is effectively absorbable, to thereby permit an accurate control to be easily and firmly effected.

Another object of the present invention is to provide a remote operation type damping force control mechanism for hydraulic dampers, in which the reverse rotation of an operation member is effectively prevented.

The above and further features, objects and advantages of the present invention will more fully appear from the following detailed description of the preferred embodiment of the invention when the same is read in conjunction with the accompanying drawings.

BRIEF DESCRIPTION OF THE ACCOMPANYING DRAWINGS

FIG. 1 is a longitudinal sectional side view of a hydraulic damper including a remote operation type damping force control mechanism according to the invention.

FIG. 2 is an enlarged plan view taken in the direction of arrow "2" of FIG. 1.

FIG. 6 is a plan view of an operation member in the remote operation part of FIG. 5.

FIG. 7 is a plan view of a mounting seat in the remote operation part of FIG. 5.

FIG. 8 is a longitudinal sectional view taken along line 8—8 of FIG. 7.

FIG. 9 is an enlarged longitudinal sectional partial view of the mounting seat of FIG. 7.

FIG. 10 is a longitudinal sectional partial view of a modified mounting seat.

FIG. 11 is a longitudinal sectional view of a face gear in the remote operation part of FIG. 5.

FIG. 12 is an explanatory partial sectional view of a partly modified remote operation part.

DETAILED DESCRIPTION OF THE INVENTION

Figure 3:
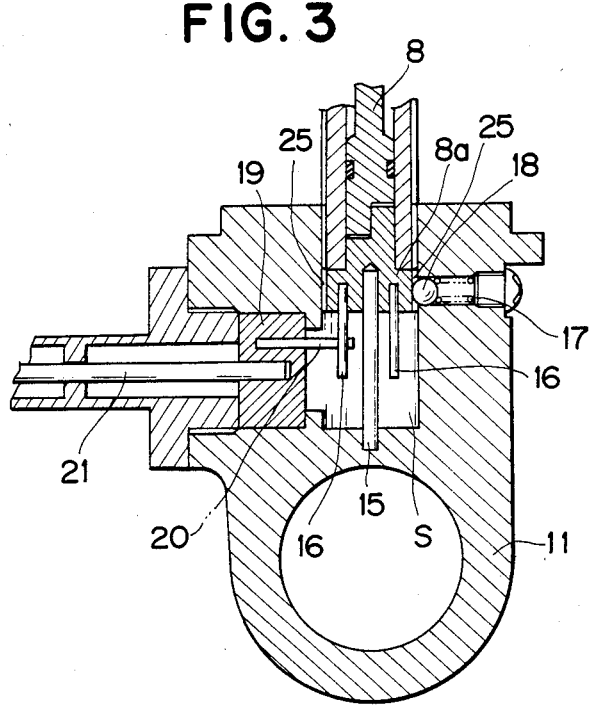
FIG. 3 is an enlarged longitudinal sectional view of an essential part of the damping force control mechanism of FIG. 1.

Referring first to FIG. 1, generally designated at reference character 40 is a hydraulic damper. The hydraulic damper 40 has a cylinder 1 in which a hollow piston rod 2 is inserted from below. On the upper part of the piston rod 2, near the upper end thereof, there is fixed a piston 3 vertically slidably fitted in the cylinder 1 and moreover, at the upper side relative to the piston 3, a case member 4 is threadedly affixed. Further, near the lower end of the cylinder 1, in contact with the inner circumference thereof, there is fitted a rod guide 6 having an oil seal 5 fitted on the outer circumference of the piston rod 2 in oil-tight slidable contact therewith, while the lower end of the cylinder 1 is closed by a plug member 7 through which the piston rod 2 is inserted.

Accordingly, the interior of the cylinder 1 is separated by the piston 3 into an upper hydraulic chamber S1 and a lower hydraulic chamber S2, the hydraulic chambers S1, S2 being filled with hydraulic oil.

On the other hand, in the piston rod 2, there is rotatably inserted an adjustment rod 8 as shown in FIG. 1. The adjustment rod comprises an upper member forming a rod portion of the adjustment rod and a lower member 8a forming a large diameter portion of said adjustment rod, the upper member and the lower member engaging with each other. The adjustment rod 8 is provided at the upper end thereof with an orifice plate 9 fitted thereon so as to be integrally rotatable therewith and accommodated in the case member 4, the orifice 9 having a plurality of orifices of different diameters pierced therein on a single pitch circle at an equal pitch angle, i.e., four orifices at a pitch of 90° in this embodiment.

In the upper part of the case member 4, in contact with the inner circumference thereof, there is fitted a plate 10 having an oil hole 10a opened therethrough at the position of a particular one of the different-diameter orifices pierced in the orifice plate 9.

As shown in FIG. 1, the adjustment rod 8 is formed to have a relatively small diameter along the intermediate to the upper part thereof to define a gap ΔS between same and the piston rod 2. Moreover, in the upper side part of the piston rod 2, there is provided an oil hole 2a through which the gap ΔS communicates with the lower hydraulic chamber S2 of the cylinder 1.

Further, as shown in FIG. 1, the piston rod 2 has at the lower end part thereof an under bracket 11 fixed thereto, the under bracket 11 supporting a lower spring seat 12, and a coil spring 14 is compressed to be provided between this lower spring 12 and an upper spring seat 13 secured on the upper outer circumference of the cylinder 1.

Figure 4:
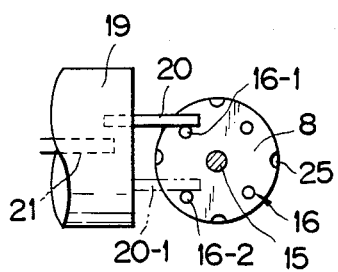
FIG. 4 is an explanatory functional view of a driving mechanism for an adjustment rod.

Referring now to FIG. 3, in the under bracket 11 there is defined a space S into which the large diameter portion 8a forming the lower end of the adjustment rod 8 is inserted while being supported with a support shaft 15. The lower end of the adjustment rod 8 has four pins 16 arranged on the end face thereof around said support shaft, as shown in FIG. 4, on a single pitch circle at an equal pitch angle of 90°, the pins 16 projecting downwardly therefrom. The large diameter portion 8a of the adjustment rod 8 is formed in the outer circumference thereof with a plurality of vertical grooves 25 engageable, only a certain one at a time, with a ball 18 normally biased by a spring 17 laid in the under bracket 11, to thereby produce a click when the adjustment rod 8 is rotated.

In the side wall of the bracket 11 there is rotatably supported a rotary body 19 having on the end face thereof facing the space S a single pin 20 projecting therefrom, the pin 20 extending perpendicular to the pins 16 projecting from the adjustment rod 8, so as to be engageable with one of them. At the opposite end face of the rotary body 19 there is fixed one end of a control cable 21 through which the main body of the hydraulic damper 40 is connected to a remote control unit 30 provided separately threrefrom, as shown in FIG. 1.

Referring again to FIG. 1 and with reference to FIG. 2, in the remote control unit 30 there are rotatably accommodated large and small gears 32, 33 engaged with each other. The large gear 32 has its shaft 32a provided with an adjustment dial 34 integrally rotatable therewith. As shown in FIG. 2, the adjustment dial 34 is engraved with four digits "1", "2", "3" and "4" as indexes to indicate the control position. The small gear 33 has a shaft 33a thereof to which the other end of the control cable 21 is connected to be secured. The large and small gears 32, 33 have a gear ratio determined such that the small gear 33 makes just one rovolution when the large gear 32 is rotated by one-fourth revolution.

There will be described hereinbelow the function of the damping force generating mechanism explained hereinabove.

When the adjustment dial 34 is rotated by one-fourth turn to change the indicated digits from "2" to "3" for example, thereby integrally rotating the large gear 32 by one fourth revolution, then the small gear 33 subjected to the above-mentioned gear ratio will make one revolution, concurrently rotating the control cable 21 by the same revolution as well as the rotary body 19 connected thereto.

In the above case, as shown in FIG. 4, in the first half revolution of the rotary body 19, the pin 20 projected therefrom will come down to lowest position 20-1, pushing one pin 16-1 of the four pins 16 projected from the adjustment rod 8 to the position in which the next pin 16-2 was standing, thereby rotating the adjustment rod 8 by one-fourth revolution. In the next half revolution of the rotary body 19, the pin 20 will return to the original position, while the adjustment rod 8 will remain where it was positioned by the first one-fourth revolution thereof. With regard to the click mechanism provided on the outer circumference of the adjustment rod 8, the engagement between the ball 18 and one of the grooves 25 is to be effected at the end of the first half revolution of the rotary body 19.

In the expansion stroke of the hydraulic damper 40, when the piston 3 is caused to travel downwardly relative to the cylinder 1, the lower hydraulic chamber S2 will have a part of its hydraulic oil running through the oil hole 2a opened in the piston rod 2, the gap ΔS, one of the orifices pierced in the orifice plate 9 and the oil hole 10a opened in the plate 10 into the upper hydraulic chamber S2, while providing the damper 40 with damping forces generated by hydrodynamic resistances such as when passing the orifice of the orifice plate 9.

In this connection, when the adjustment rod 8 is rotated by one-fourth revolution, the orifice plate 9 integrally rotating with the adjustment rod 8 will have a certain one of the orifices thereof come to the postiton of the oil hole 10a of the plate 10, thereby effecting a selection of the orifice diameter. When one of the orifices of a larger diameter is selected, the hydrodynamic resistance becomes smaller, thus reducing the damping force. To the contrary, one of a smaller diameter as selected will enlarge the hydrodynamic resistance, thus increasing the damping force.

Moreover, while the pin 20 of the rotary body 19 is working to cause through one of the pins 16, a one-fourth revolution of the adjustment rod 8, the control cable 21 will have a torsion developed in accordance with the damper load. However, during the subsequent revolution of the rotary body 19, at the initial stage of which the pin 20 as released from the engagement thereof with the pin 16 has a sufficient allowance for the return to the original position, the control cable 21 is to take an action to compensate the stored torsion, while permitting the adjustment rod 8 and the adjustment dial 34 to remain motionless, thus favorably absorbing the torsion by taking advantage of the allowance or play. As a result, the dial indication at the remote control unit 30 is kept correct, namely, the degree of revolution of the adjustment dial 34 corresponds by 1:1 to that of the adjustment rod 8, without error.

The number of the pins 16, which is four in this embodiment because the number of control stages is selected to be four, may be selectively determined, provided that such pins and control stages are kept equal to each other in number.

As apparent from the foregoing description, according to the present invention, in which a plurality of pins are projectingly provided on one end face of an adjustment rod and these pins are perpendicularly engageable with a single pin projectingly provided on one end face of a rotary body rotatably supported on the main body of a hydraulic damper, the rotary body being connected through a control cable to a remote control unit, by virtue of an allowance in the pin engagement the torsion of the control cable is favorably absorbed, thus easily effecting a constantly correct adjustment.

In the above embodiment, however, when the adjustment dial 34 is released from an operating force while the pin 20 of the rotary body 19 is engaged with and driving one of the pins 16 of the adjustment rod 8 to rotate the rod 8 by one-fourth revolution, the torsion stored in the control cable 21 may happen to force the dial 34 into a reverse turn, thus stopping the rotation of the ajustment rod 8 before it reaches the predetermined one-fourth revolution.

Further, in the above mentioned embodiment, for the structure of the remote control unit 30, the control cable 21 extends in the same axial direction as the adjustment dial 34, thus restricting the mounting position of the remote control unit 30 relative to a vehicle body. Further, the control cable 21 is always rotated in the opposite direction relative to the adjustment dial 34 and hence, where their rotating directions are required to be the same, an additional gear has to be interposed between the large and small gears 32, 33.

With reference to FIGS. 5 to 12, there will be described hereinbelow a remote control unit 130 improved with respect to such points. In FIGS. 5 to 12, the same reference characters as those of FIGS. 1 to 4 designate the same parts.

Figure 5:
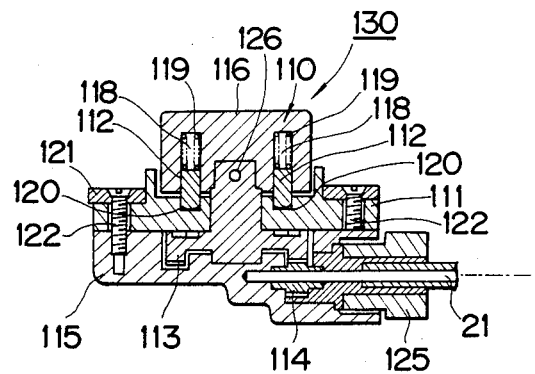
FIG. 5 is a longitudinal sectional view of a modified remote operation part.

As shown in FIG. 5, the remote control unit 130 comprises an adjustment dial 110, a mounting seat 111 of the dial 110, a plurality of parallel pins 112, engageably interposed between the opposing faces of the dial 110 and the seat 111, a driving face gear 113 integrally rotatable with the adjustment dial 110, a driven small gear 114 engaged with the face gear 113 and integrally rotatable with the control cable 21, and a dial 115 accommodating the gears 113, 114.

The adjustment dial 110 has on the upper face, along the circumference thereof, a plurality i.e., four in this embodiment, of digits 117 as a group of symbols showing present stages of damping force control, as shown in FIG. 6. At the lower face of the dial 110 there is provided the face gear 113 suspended therefrom and a plurality of pin holding holes 118 for holding the parallel pins 112 to thereby effect an intermittent rotation in accordance with the digits 117. The holding holes 118 have a plurality of biasing springs 119 inserted therein and the parallel pins 112 slidably fitted therein, while the lower or outer ends of the pins 112 are projected from the holes 118 so as to be engageable with the mounting seat 111. Namely, the mounting seat 111 is formed in the upper face thereof with a plurality of sloped slots 120, as shown in FIGS. 7 and 8, engageable with the lower ends of the parallel pins 112 and intergrally connected together with an upper cover 121 to the dial case 115 by means of a plurality of fixing screws 122. As shown in FIG. 7, the sloped slots 120 are formed arcuately on a single pitch circle so as to be symmetrical about the center of the seat 111, while as shown in FIG. 9 each has a down-sloped surface 123 followed by a substantially flat bottom part and a vertical surface 124 rising from the bottom part up to the upper surface of the seat 111 and extending radially of the seat 111. As shown in FIG. 10, there may be employed a plurality of modified sloped slots 120 each consisting of a down-sloped surface 123 and a vertical surface 124, thus having substantially the form of a letter V in cross section. In the sloped slots 120, the lower ends of the parallel pins 112 are resiliently biased to be engaged and stopped at the vertical surfaces 124, so that the relative rotation between the dial 110 and the mounting seat 111 is restricted to only one direction.

The face gear 113 as shown in FIG. 11 is arranged so as to be rotatable due to the rotation of the adjustment dial 110. Namely, the upper part of the gear 113, extending upwardly through the mounting seat 111, is integrally fixed to the lower face of the adjustment dial 110 so as to be coaxial therewith by means of a fixing pin 126, while the lower part thereof is suspended to be accommodated in the dial case 115 and has on the lower face thereof a plurality of teeth formed circumferentially and arranged radially.

As also shown in FIG. 5, the small gear 114 is axially fixed on the external end of the control cable 21 and rotatably accommodated through a connection member 125 in the dial case 115. This gear 114 has an axis of rotation arranged to be perpendicular to that of the face gear 113, which face gear 113 serves to drive the small gear 114.

In this respect, as shown in FIG. 12, by an easy rearrangement to mesh with the face gear 113 on the opposed end thereof, the small gear 114 will be rotated in a reverse direction together with the control cable 21.

According to the above embodiment, for a remote type damping force control mechanism for hydraulic dampers, when an adjustment of damping force becomes necessary while the vehicle is running, it is possible, by rotating the adjustment dial 110 to set at the position of a certain digit 117 corresponding to a desired damping force, to promptly change, through the control cable 21 interlocked with the adjustment dial 110 and rotated therewith, the damping force of the hydraulic damper to a desired control stage. Moreover, even when the adjustment dial 110 is urged to rotate in the reverse direction by the effect of a reaction due to the torsion of the control cable 21, the parallel pins 112 integral with the adjustment dial 110 become engaged with the sloped slots 120, thus favorably avoiding the reverse rotation. This effect permits the adjustment dial 110 to stably maintain a desired set position. Further, each time the control stage is changed, the parallel pins 112 enter in the sloped slots 120, so that the adjustment dial 110 provides an intermittently different load feeling, which favorably improves the operation feeling when changing the damping force.

Further, according to the foregoing embodiment, in which a means for transmitting the rotation of the adjustment dial 110 to the control cable 21 comprises the face gear 113 and the small gear 114 engaged with each other, there is favorably attained a perpendicular transmitting direction from an adjustment dial as well as a simple and compact rotation transmitting structure including the combination of two gears, thereby permitting the mounting location in the vehicle body to be selected from amongst even relatively narrow spaces.

We claim:

1. A remote operation type damping force control mechanism for a hydraulic damper including a cylinder filled with hydraulic oil, a piston slidably fitted in said cylinder, said piston separating the interior of said cylinder into a first chamber and a second chamber, a hollow piston rod fixed at the one end thereof to said piston and having defined therein an oil path permitting said first and second chambers of said cylinder to communicate with each other through holes opening into said first and second chambers, respectively, and a bracket fixed to the other end of said hollow piston rod, comprising:
    an adjustment rod (8) rotatably inserted into said hollow piston rod and provided at the inner end thereof with an orifice plate (9) having a plurality of orifices of different diameters operatively cooperating with said oil path so as to render said adjustment rod capable of varying the area of said oil path by rotation of said adjustment rod;
    a remote operation part (30) for controlling the rotation of said adjustment rod;
    said remote operation part having an operation member (34), a control cable (21) operatively integrally connected with said operation member so as to be twisted upon operation of said operation member, said control cable extending from said remote operation part to the vicinity of the outer end of said adjustment rod;
    said bracket having a space defined therein;
    driving means contained within said space and interposed between the distal end of said control cable and the outer end of said adjustment rod for driving to rotate said adjustment rod in accordance with the operation of said operation member of said remote operation part;
    said driving means comprising a support shaft (15) for supporting said adjustment rod at the outer end thereof, a plurality of first pins (16) projectingly provided on an end face of the outer end of said adjustment rod around said support shaft, and a second pin (20) integrally jointed with the distal end of said control cable and perpendicularly engageable with said first pins; and
    said adjustment rod having a large diameter portion at the outer end thereof and provided at said large diameter portion with a click mechanism operative to the rotation of said adjustment rod.

2. A remote operation type damping force control mechanism according to claim 1, wherein:
    said first pins of said driving means are provided on said end face on a single pitch circle at an equal pitch angle.

3. A remote operation type damping force control mechanism according to claim 1, wherein:
    said remote opration part has a reverse prevention mechanism (112, 120) for preventing the reverse rotation of said operation member.

4. A remote operation type damping force control mechanism according to claim 3, wherein:
    said reverse prevention mechanism comprises at least one third pin (112) held on either of respective opposed faces of said operation member and a mounting seat (111) of said operation member, while biased outwardly, and at least one sloped slot (120) formed in the other of said opposed faces so as to be engageable with said third pin.

5. A remote operation type damping force control mechanism according to claim 4, wherein:
    a plurality of said sloped slots are arranged on a single pitch circle, with an arcuate form; and
    said sloped slots have down-sloped surfaces (123) directed in the same circumferential direction and vertical surfaces (124) arranged radially.

6. A remote operation type damping force control mechanism according to claim 1, wherein:
    said remote operation part comprises a face gear (113) suspended from said operation member so as to be rotatable coaxially and integrally therewith, and a small gear (114) engaging with said face gear and having an axis lying perpendicular relative to said face gear.

7. A remote operation type damping force control mechanism according to claim 1, wherein:
    said adjustment rod comprises an upper member forming a rod portion of said adjustment rod and a lower member forming said large diameter portion of said adjustment rod, said upper member and said lower member engaging with each other.

* * * * *